United States Patent Office 2,963,339
Patented Dec. 6, 1960

2,963,339
RETARDING AND LEVELLING AGENTS

Robert Christian Keller, Basel, Switzerland, assignor to Sandoz Ltd., Basel, Switzerland No Drawing. Filed Feb. 6, 1959, Ser. No. 791,534
Claims priority, application Switzerland Feb. 11, 1958

16 Claims. (Cl. 8—87)

The present invention is concerned with retarding and levelling agents and, more particularly, with a process for the dyeing of materials consisting of or containing polyacrylonitrile fibers with basic dyestuffs in the presence of such retarding and levelling agents.

The invention has especial relation to a process for the dyeing of the said materials with basic dyestuffs, such process being characterized by the fact that the dyeing is carried out in a dyebath which contains a quaternary ammonium compound of the formula

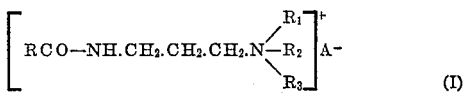

(I)

wherein the bracketed expression defines a monovalent cation, RCO— is an acyl group derived from an aliphatic carboxylic acid containing 12 to 22 carbon atoms, each of $R_1$ and $R_2$ represents an aliphatic hydrocarbon radical with 1 to 6 carbon atoms, $R_3$ represents a lower alkyl group or a lower aralkyl group of the benzene series, and $A^-$ stands for a monovalent anion, and wherein $R_1$ and $R_2$ may, together with —N< form a heterocyclic ring.

In a further aspect of the invention, the latter relates to a special group of compounds (II) which are particularly useful in carrying out the aforedescribed dyeing process and which comprise:

Stearamidopropyl-di-n-butyl-benzylammonium chloride,
Palmitinamidopropyl - di - n - butyl-benzylammonium chloride,
Oleamidopropyl-di-n-butyl-benzylammonium chloride,
Behenamidopropyl-di-n-butyl-benzylammonium chloride,
Arachidamidopropyl-di-n-butyl - benzylammonium chloride,
Stearamidopropyl-di-n-amyl - benzylammonium chloride,
Palmitinamidopropyl-di-n-amyl - benzylammonium chloride,
Oleamidopropyl-di-n-amyl - benzylammonium chloride,
Behenamidopropyl-di-n-amyl - benzylammonium chloride, and
Arachidamidopropyl-di-n-amyl - benzylammonium chloride.

Starting materials for the preparation of compounds (I) and (II) are 1,3-propylenediamine derivatives wherein one amino group is a primary amino group and the other is a tertiary amino group, for example dimethylaminopropylamine, diethylaminopropylamine, aminopropylmorpholine, dibutylaminopropylamine, diamylaminopropylamine and dihexylaminopropylamine. These propylenediamine derivatives can be prepared, for example, by reacting the appropriate dialkylamines with acrylonitrile, thus yielding the corresponding cyanoethyl-dialkylamines, and then reducing the nitrile group to the corresponding primary amino group.

Conversion of the N-dialkylaminopropylamines into the compounds (I) and (II) can be effected, for example by acylating the dialkylaminopropylamines at the primary amino nitrogen atom, whereby the corresponding acylaminopropyl-dialkylamines results, and then quaternizing the tertiary amino atom. Suitable acylating agents include, for example, the following free fatty acids and their functional derivatives such as halides, esters and anhydrides: arachidic acid, stearic acid, palmitic acid, oleic acid, talloil fatty acids, hardened whale oil fatty acid, coconut oil fatty acid, lauric acid, behenic acid.

Suitable quaternizing agents are, for example, benzyl chloride, p-methylbenzyl chloride, phenylethyl chloride, dimethylsulfate, methyl chloride.

The quaternary ammonium compounds (I) and (II) are of oily to paste-like or wax-like consistency. They have good water-solubility in the acid pH range. In dye baths they have excellent retarding capacity for basic dyestuffs, and are excellently suited for use according to the present invention for regulating the speed of exhaustion of basic dyestuffs in the dyeing of polyacrylonitrile fibers. The compounds II are, as stated, especially suitable for this purpose.

The aforenamed quaternary ammonium compounds can be employed in the presence in the bath of additaments which are conventionally present in dyeing with basic dyestuffs, for example in the presence of salts such as sodium sulfate, sodium chloride (common salt) and sodium acetate or of acids such as acetic acid or buffer mixtures.

The quantity of quaternary ammonium compound to be employed depends upon the circumstances of the dyeing; thus, it depends upon the type and quantity of the basic dyestuff and upon the character of the fibrous material being dyed and the extent to which the latter has been processed. The amount of quaternary ammonium compound to be employed thus generally ranges from about 0.02 to about 2% by weight, relative to the weight of the fibrous material, and addition thereof to the dyebath may take place prior to the dyeing process or at the beginning and/or in the course of such process. It is also possible to pretreat the fibrous material with the quaternary ammonium compounds of the invention.

The fibrous material to be dyed, according to this invention, may be in any desired form, e.g. loose or in the form of yarn or of fabric, etc. As to composition, it may consist entirely of polyacrylonitrile or of copolymers of acrylonitrile with for example vinyl alcohol, vinyl acetate, acrylic acid esters, methacrylic acid esters, acrylic acid amides and/or vinyl chloride which contain a considerable, and advantageously a predominant, proportion of polyacrylonitrile. It may also consist of a mixture of polymers containing one or more of the said monomers with polyacrylonitrile, the latter again preferably predominating. In the copolymeric acrylonitriles, the polymer molecules preferably contain an average of at least 85% by weight of combined acrylonitrile.

The trademarks of the fibers hereinbefore described are listed in "Chemiefasern auf dem Weltmarkt" (July 1957) edited by Deutsche Rhodiaceta A.G., on pages 43, 46, 47 and 55. Crylor, Dolan, Dralon, Orlon and PAN are described as polymers of acrylonitrile while Acrilan consists of 85% of acrylonitrile and of 15% of vinylacetate.

Basic dyestuffs which come within the scope of the present invention are for example the dyestuffs of the di- and tri-arylmethane series, the azine, oxazine and thiazine series, xanthene dyestuffs, acridine dyestuffs, quinoline dyestuffs, quinophthalone dyestuffs, cyanine and methine dyestuffs, basic azo and basic anthraquinone dyestuffs, etc. The basic groups present in the dyestuffs may be in internal or external position in the dyestuff molecule.

In the following examples, directed to presently preferred embodiments of the invention, the parts and percentages are by weight, and the temperatures are in degrees centigrade. The designation "C.I." refers to the Colour Index, 2nd ed., vol. 1.

Example 1

1.2 mols of N,N-di-n-butylaminopropylamine are, together with 1 mol of stearic acid, heated in a nitrogen atmosphere to 240° in the course of 6 hours, 1 mol of water being split off. Excess of amine is then distilled off under reduced pressure (12 mm. Hg). To the residue, the acid number of which amounts to 2.4, there are added 1.2 mols of benzyl chloride and 1 mol of water, and the mixture then maintained at 100–105° for 5 hours. The resultant product—stearamidopropyl-di-n-butyl-benzylammonium chloride—has, in the anhydrous state and at room temperature (about 20 to about 30°), a honey-like appearance. It has good solubility in water and possesses an excellent retarding capacity for basic dyestuffs in the dyeing of polyacrylonitrile fibers.

Example 2

1.2 mols of N,N-di-n-butylaminopropylamine are refluxed at 160° together with one mole of lauric acid in the presence of xylene as entraining agent and with interposition of a water separator, until one mole of water has separated. Excess amine and xylene are distilled off under reduced pressure. The residue is then condensed with 1.2 mols of benzyl chloride for 5 hours at 120°, after which excess benzyl chloride is removed. Lauramidopropyl-di-n-butyl-benzylammonium chloride is thus obtained as a light, wax-like water-soluble product.

Example 3

The procedure described in Example 1 is repeated, except that the one mol of stearic acid is replaced by one mol of oleic acid. The resultant product, oleamidopropyl-di-n-butyl-benzylammonium chloride, is a brownish oily product with excellent retarding capacity for basic dyestuffs in the dyeing of polyacrylonitrile fibers.

Example 4

285 parts of a several times-distilled talloil fatty acid mixture, which has a saponification number of 195, and acid number of 194 and an iodine number of 129 (Wijs) and contains 1% of rosin acids, in addition to 2% of unsaponifiables, are maintained at 145–160° together with 230 parts of N,N-di-n-butylaminopropylamine in the presence of xylene, until 18 parts of water have distilled off. After removal of excess amine, 1 mol of dimethyl sulfate is added dropwise at 60–70°. The resultant oily product acts as a retarder for basic dyestuffs.

Example 5

The procedure described in Example 2 is repeated, except that the one mol of lauric acid is replaced by one mol of behenic acid. The resultant product, behenamidopropyl-di-n-butyl-benzylammonium chloride, has a wax-like appearance and has good solubility in water. It is an excellent retarder for basic dyestuffs.

Example 6

In manner analogous to those described in the preceding examples, corresponding quaternary ammonium compounds, namely:

(a) Behenamidopropyl - di - n - butyl - methylammonium-methosulfate;
(b) Stearamidopropyl - di - n - amyl - methylammonium-methosulfate;
(c) Palmithinamidopropyl - di - n - butyl - (p - methylbenzyl)ammonium chloride;
(d) Stearamidopropyl - di - n - amyl - benzylammonium chloride;
(e) Palmitinamidopropyl - di - n - hexyl - methyl - ammonium-methosulfate, are prepared from the starting materials set forth in the following table:

| Fatty Acid | Dialkylaminopropylamine | Quaternizing Agent |
|---|---|---|
| (a) behenic acid | N,N-di-n-butylaminopropylamine. | dimethyl sulfate. |
| (b) stearic acid | N,N-di-n-amylaminopropylamine. | Do. |
| (c) palmitic acid | N,N-di-n-butylaminopropylamine. | p-methylbenzyl chloride. |
| (d) stearic acid | N,N-di-n-amylaminopropylamine. | benzyl chloride. |
| (e) palmitic acid | N,N-di-n-hexylaminopropylamine. | dimethyl sulfate. |

The so-obtained products are retarding and levelling agents for basic dyestuffs in the dyeing of polyacrylonitrile fibers.

Example 7

100 parts of polyacrylonitrile staple fibers in skein form ("More Dyeable Orlon 42," du Pont) are dyed in 5000 parts of an aqueous dyebath containing, in solution, 0.7 part of Auramin O (C.I. 41000), 0.8 part of concentrated acetic acid, 1.0 part of stearamidopropyl-di-n-butyl-benzylammonium chloride (cf. Example 1).

The fibrous material is entered into the bath at 50° the bath heated to 100° in the course of 45 minutes, and dyeing carried out at the latter temperature for 60 minutes. The stearamidopropyl-di-n-butyl-benzylammonium chloride has a retarding and levelling effect on the exhaustion of the dyebath, i.e. on the speed at which the dye is taken up by the fibrous material.

Example 8

The procedure according to Example 7 is repeated, except that the Auramin O is replaced by a corresponding quantity of one of the following dyestuffs:

Safranine B _____ (C.I. 50240)
Meldola Blue M _____ (C.I. 51175)
Rhodamine B _____ (C.I. 45170)
Bismarck Brown R _____ (C.I. 21010)
Crystal Violet 5 BO _____ (C.I. 42555)
Astraphloxine FF _____ (Schultz, Farbstofftabellen, vol. 1 [1931],No. 930)
Brilliant Acridine Orange R__ (C.I. 46070)
Chrysoidine B _____ (C.I. 11270)

In each case, the quaternary ammonium compound exerts a retarding and levelling action on the exhaustion of the dyestuff from the bath.

Example 9

The procedures of Examples 7 and 8 are repeated while replacing the 0.1 part of stearamidopropyl-di-n-butyl-benzylammonium chloride (per dyebath) by one of the following retarders of the present invention, the indicated quantity being based on the weight of the material being dyed:

(i) 0.1% of oleamidopropyl-di-n-propyl-benzylammonium chloride;
(ii) 0.2% of stearamidopropyl-dimethyl-benzylammonium chloride;
(iii) 0.1% of behenamidopropyl-di-n-butyl-benzylammonium chloride;
(iv) 0.2% of stearamidopropyl-diethyl-benzylammonium chloride;
(v) 0.4% of stearamidopropyl-trimethylammonium-metho-sulfate;
(vi) 0.3% of arachinamidopropyl-di-n-propyl-methylammonium-methosulfate.

In each case, the added auxiliary exerts a retarding and levelling action on the drawing of the dyestuff onto the fiber.

Example 10

A dyebath is prepared which, relative to the weight of the material being dyed, contains 0.5% of Genacryl Blue 5B (C.I. 42140), 3% of concentrated acetic acid, 3% of sodium acetate and 0.2% of stearamidopropyl-di-n-butyl-benzylammonium chloride. Orlon piece goods ("More Dyeable Orlon 42," du Pont) is entered in a goods-to-liquor ratio of 1:50 at 45°, whereupon the temperature of the bath is raised to boiling in the course of 45 minutes, and dyeing continued at this temperature for one more hour. A level dyeing is obtained.

Example 11

The dyeing procedure according to Example 10 is repeated, except that the 0.5% of Genacryl Blue 5B is replaced by one of the following (the percentages being again relative to the weight of the goods being dyed):

0.5% of Genacryl Blue 6G____ (C.I. 42025);
0.5% of Sevron Yellow R_____ (C.I. Basic Yellow 11);
0.5% of Sevron Yellow L_____ (C.I. Basic Yellow 13);
0.5% of Sevron Blue B_____ (C.I. Basic Blue 21);
0.5% of Sevron Green B_____ (C.I. Basic Green 3).

In each case, a level dyeing is obtained.

Example 12

The procedures of Examples 10 and 11 are repeated while replacing the quaternary ammonium compound there employed with one of the following retarding and levelling agents, using the indicated percentages of the respective compounds (relative to the weight of the material being dyed):

(vii) 0.3% of stearamidopropyl-di-n-butyl-methylammonium chloride;
(viii) 0.7% of lauramidopropyl-diethyl-benzylammonium chloride;
(ix) 0.1% of behenamidopropyl-trimethylammonium-methosulfate;
(x) 0.05% of behenamidopropyl-di-n-butyl-benzylammonium chloride;
(xi) 0.2% of palmitinamidopropyl-di-n-hexyl-benzylammonium chloride.

In each case, a level dyeing is obtained.

Example 13

(a) Orlon 81 filament (du Pont) is boiled in a dyebath with 0.1% of Sevron Yellow L (C.I. Basic Yellow 13) in the presence in the bath of 10% of sodium sulfate and of 0.1% of palmitinamidopropyl-di-n-butyl-benzylammonium chloride, the boiling being carried out for 50 minutes, and a goods-to-liquor ratio of 1:50 being employed. Drawing of the dye onto the fiber proceeds significantly more slowly than in a similar dyeing procedure in the absence of the retarding agent but otherwise the same.

(b) The dyeing process described in the preceding paragraph (a) is repeated, except that the 0.1% of stearamidopropyl-di-n-butyl-benzylammonium chloride (calculated relative to the weight of the material being dyed) is used instead of the palmitinamidopropyl-di-n-butyl-benzylammonium chloride. Here again, significant retarding is achieved.

Example 14

(a) A series of dyebaths are prepared, each of which contains in solution in 500 parts of aqueous liquor, 1 part of sodium sulfate, 0.02 part of Sevron Yellow L (C.I. Basic Yellow 13) and 0.02 part of stearamidopropyl-di-n-butyl-benzylammonium chloride. Dyeing of 10 parts of the following polyacrylonitrile fibrous materials is carried out in the respective dyebaths, i.e. one of the said materials is dyed in one of the said dyebaths, and the several other materials in the several other dyebaths:

Dolan (Süddeutsche Zellwolle A.G., Kehlheim, Germany), in the form of fabric;
Dralon (Farbenfabriken Bayer, Germany), in the form of fabric;
PAN (Cassella, Germany), in the form of loose staple fibers;
Crylor (Rhodiaceta S.A., France), in the form of filaments;
Acrilan (Chemstrand Corp., U.S.A.), in the form of staple yarn.

The dyeing is in each case begun at 50°, after which the temperature is raised to boiling in the course of 40 minutes and then maintained at boiling temperature for one hour. In each case, the added quaternary ammonium compound has a retarding action on the drawing of the dye onto the fiber.

(b) Similar results are obtained in each of the cases described in the preceding paragraph (a) if the stearamidopropyl-di-n-butyl-benzylammonium chloride is replaced by arachinimidopropyl-di-n-propyl-benzylammonium chloride.

Having thus disclosed the invention, what is claimed is:

1. A method of dyeing fibrous material consisting at least predominantly of polyacrylonitrile which comprises immersing the fibrous material in an aqueous dyebath containing a basic dyestuff and from about 0.02 to about 2.0% by weight, relative to the weight of the fibrous material, of a quaternary ammonium compound of the formula

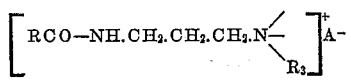

wherein the bracketed expression defines a monovalent cation, RCO— is an acyl radical of an aliphatic monocarboxylic acid containing 16 to 22 carbon atoms, $R_3$ is a member selected from the group consisting of lower alkyl and lower aralkyl, the two residual valences of the basic nitrogen atom being saturated by radicals selected from the group consisting of monovalent aliphatic hydrocarbon radicals with 1 to 6 carbon atoms and the divalent radical

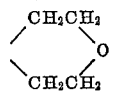

and A⁻ stands for a monovalent anion, whereby exhaustion of the dyestuff from the bath is retarded and a level dyeing is obtained.

2. A method according to claim 1, wherein the fibrous material consists entirely of polyacrylonitrile.

3. A method according to claim 1, wherein the fibrous material consists of a polyacrylonitrile copolymer.

4. A method according to claim 1, wherein the quaternary ammonium compound is stearamidopropyl-di-n-butyl-benzylammonium chloride.

5. A method according to claim 1, wherein the quaternary ammonium compound is palmitinamidopropyl-di-n-butyl-benzylammonium chloride.

6. A method according to claim 1, wherein the quaternary ammonium compound is oleamidopropyl-di-n-butyl-benzylammonium chloride.

7. A method according to claim 1, wherein the quaternary ammonium compound is behenamidopropyl-di-n-butyl-benzylammonium chloride.

8. A method according to claim 1, wherein the quaternary ammonium compound is arachidamidopropyl-di-n-butyl-benzylammonium chloride.

9. A method according to claim 1, wherein the quaternary ammonium compound is stearamidopropyl-di-n-amyl-benzylammonium chloride.

10. A method according to claim 1, wherein the quaternary ammonium compound is palmitinamidopropyl-di-n-amyl-benzylammonium chloride.

11. A method according to claim 1, wherein the quaternary ammonium compound is oleamidopropyl-di-n-amyl-benzylammonium chloride.

12. A method according to claim 1, wherein the quaternary ammonium compound is behenamidopropyl-di-n-amyl-benzylammonium chloride.

13. A method according to claim 1, wherein the quaternary ammonium compound is arachidamidopropyl-di-n-amyl-benzylammonium chloride.

14. A method of dyeing fibrous material consisting at least predominantly of polyacrylonitrile which comprises immersing the fibrous material in an aqueous dyebath containing a basic dyestuff and from about 0.02 to about 2.0% by weight, relative to the weight of the fibrous material, of a quaternary ammonium compound containing a cation of the formula

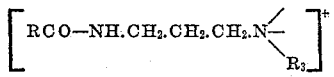

wherein RCO— is an acyl radical of an aliphatic monocarboxylic acid containing 16 to 22 carbon atoms, and $R_3$ is a member selected from the group consisting of lower alkyl and lower aralkyl, the two residual valences of the basic nitrogen atom being saturated by radicals selected from the group consisting of monovalent aliphatic hydrocarbon radicals with 1 to 6 carbon atoms and the divalent radical

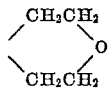

whereby exhaustion of the dyestuff from the bath is retarded and a level dyeing is obtained.

15. A method of retarding the exhaustion of an aqueous dyebath containing a basic dyestuff while immersing therein fibrous material consisting at least predominently of polyacrylonitrile and thereby realizing level dyeing action, which comprises incorporating into said dyebath from about 0.02 to about 2.0% by weight, relative to the weight of the fibrous material, of a quaternary ammonium compound containing a cation of the formula

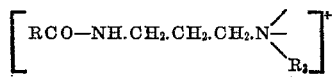

wherein RCO— is an acyl radical of an aliphatic monocarboxylic acid containing 16 to 22 carbon atoms, and $R_3$ is a member selected from the group consisting of lower alkyl and lower aralkyl, the two residual valences of the basic nitrogen atom being saturated by radicals selected from the group consisting of monovalent aliphatic hydrocarbon radicals with 1 to 6 carbon atoms and the divalent radical

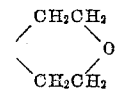

16. An aqueous dyebath composition for the level dyeing of fibrous material consisting at least predominantly of polyacrylonitrile and containing, as essential ingredients, a basic dyestuff and from about 0.02 to about 2% by weight, relative to the weight of the fibrous material to be dyed, of a retarding and levelling agent selected from the group consisting of stearamidopropyl-di-n-butyl-benzylammonium chloride, palmitinamidopropyl - di - n-butyl-benzylammonium chloride, oleamidopropyl - di - n-butyl-benzylammonium chloride, behenamidopropyl-di-n-butyl-benzylammonium chloride, arachidamidopropyl-di-n-butyl-benzylammonium chloride, stearamidopropyl-di-n-amyl-benzylammonium chloride, palmitinamidopropyl-di-n-amyl-benzylammonium chloride, oleamidopropyl-di-n-amyl-benzylammonium chloride, behenamidopropyl-di-n-amylbenzylammonium chloride and arachidamidopropyl-di-n-amyl-benzylammonium chloride.

References Cited in the file of this patent

UNITED STATES PATENTS

| | | |
|---|---|---|
| 2,716,655 | Boyd | Aug. 30, 1955 |
| 2,821,526 | Boyd | Jan. 28, 1958 |
| 2,891,835 | Matter | June 23, 1959 |

OTHER REFERENCES

Clarke: Amer. Dyest, Rep., August 29, 1955, p. 633.
Man Made Textiles, December 1955, p. 68.
Neary: Amer. Dyest. Rep., August 26, 1957, p. 626.
Schwartz: Surface Active Agents, Intersci., pub. N.Y., 1949, pp. 172–177.